(12) United States Patent
Utting

(10) Patent No.: US 12,235,187 B2
(45) Date of Patent: Feb. 25, 2025

(54) TRANSPORTABLE VEHICLE ENCLOSURE FOR INSPECTING VEHICLES

(71) Applicant: David John Utting, Norwich (GB)

(72) Inventor: David John Utting, Norwich (GB)

( * ) Notice: Subject to any disclaimer, the term of this patent is extended or adjusted under 35 U.S.C. 154(b) by 251 days.

(21) Appl. No.: 16/756,390

(22) PCT Filed: Oct. 16, 2018

(86) PCT No.: PCT/GB2018/052970
§ 371 (c)(1),
(2) Date: Apr. 15, 2020

(87) PCT Pub. No.: WO2019/077330
PCT Pub. Date: Apr. 25, 2019

(65) Prior Publication Data
US 2020/0240874 A1    Jul. 30, 2020

(30) Foreign Application Priority Data
Oct. 16, 2017    (GB) ...................................... 1716980

(51) Int. Cl.
*B60S 3/04*      (2006.01)
*B60S 3/00*      (2006.01)
*G01M 17/02*     (2006.01)

(52) U.S. Cl.
CPC ........... *G01M 17/027* (2013.01); *B60S 3/002* (2013.01); *B60S 3/04* (2013.01); *B60S 3/042* (2013.01)

(58) Field of Classification Search
CPC .................................................... G01M 17/27
See application file for complete search history.

(56) References Cited

U.S. PATENT DOCUMENTS

| | | | | |
|---|---|---|---|---|
| 6,661,516 B1* | 12/2003 | Dietsch | .................. | B60S 3/002 |
| | | | | 356/399 |
| 6,709,530 B1* | 3/2004 | Dietsch | .................. | B60S 3/002 |
| | | | | 134/45 |
| 6,972,693 B2* | 12/2005 | Brown | ................. | G01V 5/0008 |
| | | | | 340/928 |
| 9,604,563 B1* | 3/2017 | Wilson, II | ............. | G06Q 40/08 |
| 2006/0114531 A1* | 6/2006 | Webb | ................. | G01N 21/8851 |
| | | | | 359/15 |

(Continued)

FOREIGN PATENT DOCUMENTS

| | | | | |
|---|---|---|---|---|
| EP | 0507757 A1 * | 10/1992 | ................ | B60S 3/04 |
| FR | 2862264 A1 * | 5/2005 | ................ | B60S 3/04 |

OTHER PUBLICATIONS

FR2862264—Machine Translation (Year: 2005).*

(Continued)

*Primary Examiner* — Marc Lorenzi
(74) *Attorney, Agent, or Firm* — Workman Nydegger

(57) ABSTRACT

A transportable vehicle enclosure for inspecting vehicles is formed as a mono-block suitable for loading onto a transporter and unloading from a transporter. The enclosure includes side, front, rear, ceiling and floor portions, at least one of the portions being configured to allow vehicular assess whereby, in use, a vehicle maybe placed within the enclosure. The enclosure further includes a plurality of cameras integrated into or on a plurality of proportions for imaging each side of the vehicle when a vehicle is located in the enclosure.

25 Claims, 1 Drawing Sheet

(56) References Cited

U.S. PATENT DOCUMENTS

| | | | |
|---|---|---|---|
| 2007/0057815 A1* | 3/2007 | Foy | H04N 5/2627 |
| | | | 340/905 |
| 2009/0033744 A1 | 2/2009 | Frantz | |
| 2014/0202505 A1* | 7/2014 | Cotton | B60S 3/04 |
| | | | 134/57 R |
| 2017/0147990 A1* | 5/2017 | Franke | G06Q 40/08 |
| 2017/0301103 A1* | 10/2017 | Gonzaga | G01M 17/027 |

OTHER PUBLICATIONS

International Search Report dated Mar. 11, 2019, issued in PCT Application No. PCT/GB2018/052970, filed Oct. 16, 2018.
Written Opinion dated Mar. 11, 2019, issued in PCT Application No. PCT/GB2018/052970, filed Oct. 16, 2018.

* cited by examiner

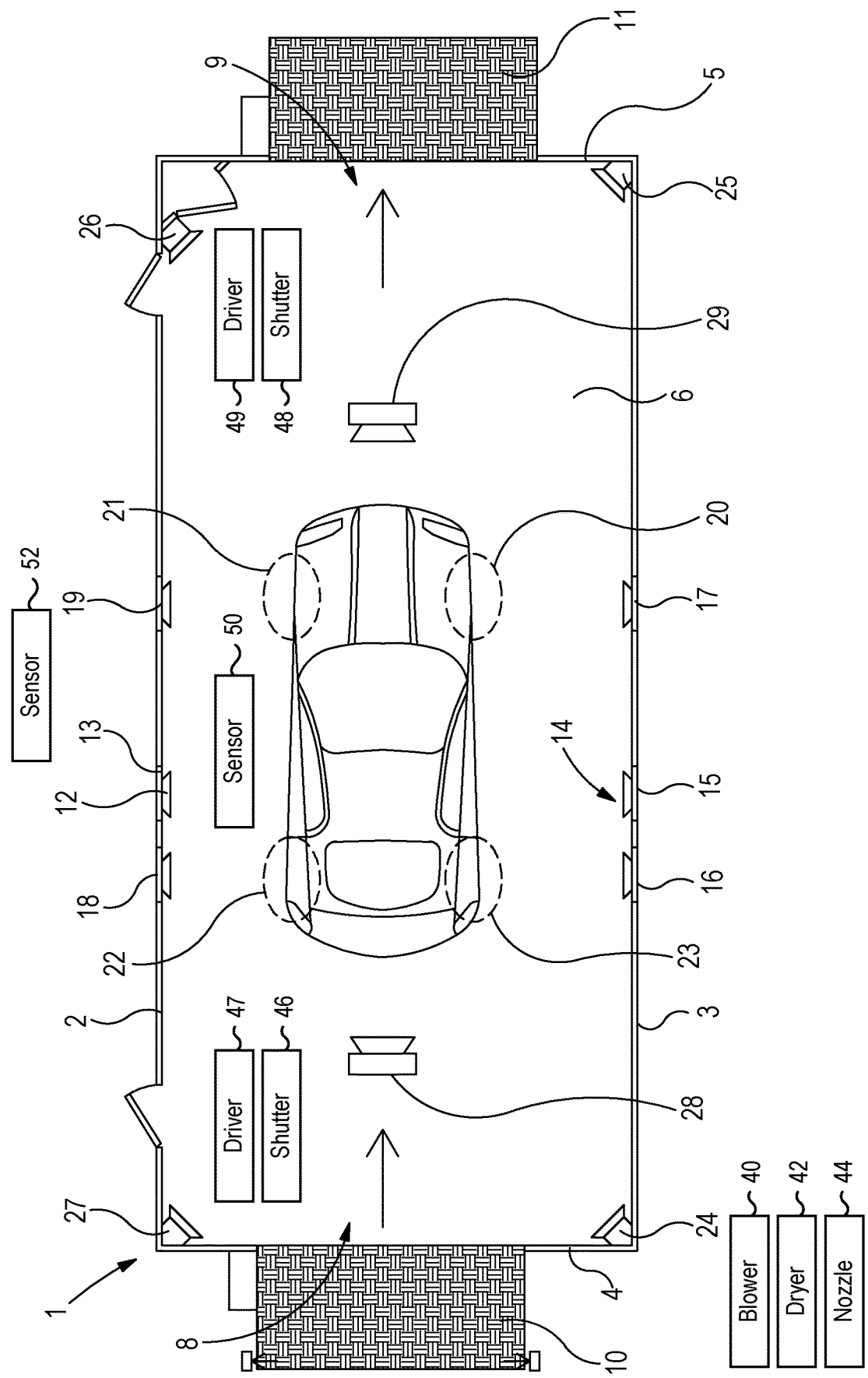

TRANSPORTABLE VEHICLE ENCLOSURE FOR INSPECTING VEHICLES

FIELD OF THE INVENTION

The invention relates to transportable vehicle enclosures and/or methods related thereto.

BACKGROUND TO THE INVENTION

Imaging large objects such as motorcars in various locations and in various states of repair or conditions can be particularly complex. These operations are typically carried out in large garages which are often in inconvenient locations. Only once the vehicles arrive at these remote locations can assessments and inspections be completed. The invention seeks to reverse this conventional thinking by providing a structure which is both capable of transportation to a site whilst at the same time providing improvements to the assessment process that can be achieved onsite.

SUMMARY OF THE INVENTION

In a first broad independent aspect, the invention provides a transportable vehicle enclosure for transporting vehicles; the enclosure being formed as a mono-block suitable for loading onto a transporter and unloading from a transporter comprising side, front, rear, ceiling and floor portions; one of said portions being configured to allow vehicular access whereby, in use, a vehicle may be placed within the enclosure; the enclosure further comprising a plurality of camera's integrated into or on a plurality of the portions for imaging each side of the vehicle when a vehicle is located in the enclosure.

This configuration is particularly advantageous because it provides the imaging of large vehicles on site whilst improving the quality of the achievable inspections. It may for example in certain embodiments provide for imaging of each one of the panels in all six of the orthogonal axes. This allows the assessment of for example individual panel damage without further damage arising from excessive vehicle transportation.

In a further subsidiary aspect, the transportable vehicle enclosure comprises a camera located at a height for imaging the wheel rims of a vehicle when a vehicle is located in the enclosure. This configuration is particularly advantageous in order to more rapidly assess both the vehicle panels and the wheel rims.

In a further subsidiary aspect, one or more of the cameras comprises a housing which is fixed to a side portion. In certain embodiments, there is no requirement for additional camera mounting means as these may be secured within the enclosure's own structure.

In a further subsidiary aspect, one or more of the cameras comprises a housing which is fixed to a corner region between the side portion and either the front or rear portions of the enclosure. This allows advantageous assessment of the corner regions of the vehicle. It also allows for certain embodiments the incorporation of optical recognition software to obtain number plate data from a vehicle in order to associate the images obtained from the vehicle with an individual alphanumeric reference such as a number plate.

In a further subsidiary aspect, the transportable vehicle enclosure further comprises one or more cameras in the floor portion of the enclosure. This configuration is particularly advantageous as it provides an assessment of difficult to reach portions of the vehicle and may in certain embodiments provide advantageous shape and configuration data with respect to the wheel itself.

In a further subsidiary aspect, the transportable vehicle enclosure further comprises a means for assessing the tread of one or more of the vehicle's tyres.

In a further subsidiary aspect, the front portion is configured to facilitate the entrance of a vehicle and the rear portion is configured to facilitate the exit of a vehicle. This configuration is particularly advantageous as it allows a succession of vehicles to be processed through the transportable vehicle enclosure.

In a further subsidiary aspect, the front portion incorporates a shutter and a driver to open and/or close the shutter. This is particularly advantageous in terms of the achievable variation in aperture which may be achieved for enhanced imaging.

In a further subsidiary aspect, the rear portion incorporates a shutter and a driver to open and/or close the shutter. This allows the lighting in the vehicle to be adjusted by selectively opening and closing the front or rear shutter for enhanced imaging of the vehicle. In a further subsidiary aspect, a light sensor is provided within the enclosure and the shutters are opened and/or closed to a varying degree dependent upon the level of light sensed within the enclosure. In a further subsidiary aspect, the enclosure is equipped with an external light sensor which provides an indication of the level of light external to the enclosure in order to vary the aperture of the shutters as appropriate.

In a further subsidiary aspect, the enclosure further comprises a blower for blowing a medium onto at least part of the vehicle. This is particularly advantageous in terms of drying a vehicle in order to improve the quality of the assessment which may then be carried out within the enclosure. In a further subsidiary aspect, a timer is provided to control the duration of activation of the blower in order to dry the vehicle and thereafter automatically trigger the action of the camera to capture images of the vehicle once sufficiently dried.

In a further subsidiary aspect, the enclosure incorporates an integral dryer that dries the vehicle prior to inspection of the vehicle. This is particularly advantageous in minimising wet surface build up within the enclosure which may lead to non-uniform imaging of vehicle panels.

In a further subsidiary aspect, the integral dryer is configured to direct dry medium towards the wheel rims prior to entry to the enclosure. In certain embodiments, this allows the enclosure to provide drying as the vehicle enters the enclosure and thus avoiding a separate drying station whilst at the same time improving quality of the vehicles inspection which may take place subsequently.

In a subsidiary aspect, the cameras are configured to pan and/or tilt to scan each panel of the vehicle. This configuration is particularly advantageous in terms of assessing the condition of individual panels by changing the angle from which the individual panels are assessed.

In a further subsidiary aspect, the enclosure further comprises an entrance ramp with an integral blower.

In a subsidiary aspect, the enclosure further comprises a nozzle directed toward the vehicle for cleaning the vehicle. This configuration is particularly advantageous in order to provide cleaning of the vehicle prior to camera inspection.

In a further independent aspect, the invention provides a transportable vehicle enclosure that is substantially as herein described and/or illustrates in any appropriate combination of the accompanying text and/or figures.

In a further independent aspect, the invention provides a method of inspecting a vehicle comprising the steps of opening a transportable vehicle enclosure according to any of the preceding aspects; driving a vehicle into the enclosure; closing the enclosure; imaging a plurality of external parts of the vehicle; opening the transportable vehicle enclosure; and driving a vehicle out of the enclosure.

In a further broad independent aspect, the invention provides a method of preparing a vehicle comprising the steps of opening a transportable vehicle enclosure according to any of the preceding aspects; driving a vehicle into the enclosure; closing the enclosure; preparing a plurality of the external parts of the vehicle; opening the transportable vehicle enclosure and driving a vehicle out of the enclosure.

In a further broad independent aspect, the invention provides a method of treating a vehicle comprising the steps of opening a transportable vehicle enclosure according to any of the preceding aspects; driving a vehicle into the enclosure; closing the enclosure; treating a plurality of the external parts of the vehicle; opening the transportable vehicle enclosure and driving a vehicle out of the enclosure.

In a subsidiary aspect, the method further comprises the steps of blowing a medium onto the vehicle as it enters the enclosure. This allows improved imaging to be achieved.

In a further subsidiary aspect, the method further comprises the steps of imaging a vehicle from one or a combination of each one of the following: upper elevation, lower elevation, right side elevation, left side elevation, front and rear elevation. This configuration is particularly advantageous in order to provide full one stop imaging for a vehicle in certain preferred embodiments.

In a further subsidiary aspect, the method further comprises the steps of imaging a vehicle's tyre by providing a camera in a side elevation position of a vehicle tyre when a vehicle is provided in the enclosure. This configuration is particularly advantageous for improved assessment of a vehicle tyre.

In a further subsidiary aspect, the method further comprises the steps of providing a camera below the vehicle tyre to image the tread of a tyre when a vehicle is provided in the enclosure.

BRIEF DESCRIPTION OF THE FIGURES

FIG. 1 shows a schematic view of a transportable vehicle enclosure.

DETAILED DESCRIPTION OF THE FIGURES

FIG. 1 shows a transportable vehicle enclosure generally referenced 1. The enclosure is formed preferable as a mono-block suitable for loading onto a transporter and loading from a transporter at any particular location. The mono-block may incorporate a plurality of struts and joining panels to allow the vehicle to be lifted and placed in a location for use as a single integral structure. The enclosure has side walls or portions 2 and 3 and front and rear portions 4 and 5. The enclosure has a transportable floor which is integrally formed with the upright portions 2, 3, 4 and 5. The floor 6 may have a number of struts to support the weight of a vehicle. The height of floor 6 also allows the incorporation of drains and bespoke equipment for use with the enclosure. In order to allow vehicular access to the enclosure the front portion 4 has an aperture 8 and an exit 9. In this embodiment, there is both an entrance and an exit. Both have ramps 10 and 11 which are employed to allow the vehicle to clear the height of the floor. The ramps may also be equipped with air wheel blowers or an integral dryer. The roof of the enclosure may be provided with an overhanging portion to extend over the ramps as appropriate. This kind of overhanging portion may incorporate a cleaning nozzle and/or blowers and/or dryers in order to facilitate the cleaning of the vehicle before the entrance into the enclosure.

An array of cameras is provided throughout. A side camera 12 is provided with a housing 13 which is integral with the left-side portion of the enclosure. Similarly, a further camera 14 is provided in the right-side portion of the enclosure with a housing 15 at least partially embedded in the side wall 3. Further cameras such as cameras 16, 17, 18 and 19 are upright in a side elevation but at a height corresponding to the wheel rims in order to specifically image each one of the rims. In addition, as shown by dashed lines, the floor may incorporate a number of windows 20, 21, 22 and 23 which allow the positioning of the cameras to image the tread of individual wheels. These cameras may be fixed into position relative to the floor but may be equipped with pan and tilt functionality in order to provide multiple angles of inspections. In further embodiments, the cameras may be displaceable in at least the plane of the surface in which they are embedded. In further embodiments, the cameras may be equipped with 3D displacement means such as an articulated arm for bespoke positioning for inspection. In addition, further cameras may be provided in the respective corners such as cameras 24, 25, 26 and 27. These may be fixed within the structure in the corner of the enclosure. In addition, a camera may also be provided in the roof of the enclosure to assess any damage to the upper panels and bonnet. Furthermore, cameras may also be provided in the front and rear positions such as cameras 28 and 29. If appropriate, these may be secured to the roof or to a portion of the front or rear portions 4 and 5.

In further embodiments, the entrance may be equipped with a fast-acting roller shutter. Similarly, the exit may also be equipped with such a roller shutter.

In further embodiments, the opening and the closing of the roller shutters may be dependent upon the required level of lighting for different imaging phases. A light detector may be provided as part of the roof of the enclosure for optimum control of the lighting within the unit. A plurality of lights may also be secured to the various portions of the enclosure in order to allow imaging in dark conditions when for example the entrance and exit shutters are fully shut due to adverse external weather conditions.

An embodiment of the invention also envisages a storage for digital medium obtained from the cameras and a wireless communication link for sending digital medium to any appropriate remote location for further assessment. A database of pre-determined vehicle parts may be employed and compared digitally with the captured images to assess any differences in the digital images which may be representative of scratches, dents and other anomalies.

The invention claimed is:

1. A transportable vehicle enclosure for inspecting vehicles, comprising:
 a mono-block housing suitable for loading onto a transporter and unloading from a transporter and comprising portions including side portions, a front portion, a rear portion, a ceiling portion and a floor portion;
 at least one of said portions being configured to allow vehicular access so that a vehicle may be placed within said mono-block housing during use;
 a first light sensor provided within said mono-block housing to determine a level of light sensed within said mono-block housing;
 a first aperture with a first shutter and a first driver to open and/or close said first shutter being incorporated into one of said front portion or said rear portion, said first driver being configured to vary said first aperture by controlling said first shutter dependent upon the level of light sensed within said mono-block housing by said first light sensor; and a plurality of cameras, at least one camera of said plurality of cameras being integrated into or on each of said portions for imaging each side of said vehicle when said vehicle is located in said enclosure, wherein said each side of said vehicle includes a bottom panel of said vehicle;

wherein said plurality of cameras image individual panel damage by assessing panels of said vehicle in six orthogonal axes when said vehicle is located in said enclosure; and wherein a cleaning nozzle and a blower are provided outside of said mono-block housing to facilitate cleaning and drying of the vehicle before entrance of the vehicle into said mono-block housing and wherein the mono-block housing is free of any cleaning nozzle and blower within the mono-block housing, whereby the enclosure facilitates the imaging of each side of said vehicle when the vehicle is located within the mono-block housing.

2. The transportable vehicle enclosure according to claim 1, wherein at least one of said plurality of cameras is located at a height for imaging wheel rims of said vehicle when said vehicle is located in said mono-block housing.

3. The transportable vehicle enclosure according to claim 1, wherein one or more of said plurality of cameras comprises a housing which is fixed to one of said side portions.

4. The transportable vehicle enclosure according to claim 1, wherein at least one of said plurality of cameras comprises a housing which is fixed to a corner region between said side portions and either said front or rear portions of said mono-block housing.

5. The transportable vehicle enclosure according to claim 1, further comprising:
said floor portion comprising a window; and
at least one of said plurality of cameras being aligned with said window for imaging at least part of an underside of said vehicle when said vehicle is located within said mono-block housing.

6. The transportable vehicle enclosure according to claim 1, further comprising:
said vehicle comprising tires and said tires have a tread; and
at least one of said plurality of cameras being configured to assess said tread when said vehicle is located within said mono-block housing.

7. The transportable vehicle enclosure according to claim 1, wherein said front portion is configured to facilitate an entrance of said vehicle into said mono-block housing and said rear portion is configured to facilitate an exit of said vehicle from said mono-block housing.

8. The transportable vehicle enclosure according to claim 7, wherein said front portion incorporates said first aperture with said first shutter and said first driver.

9. The transportable vehicle enclosure according to claim 8, wherein said rear portion incorporates a second aperture with a second shutter and a second driver to open and/or close said second shutter.

10. The transportable vehicle enclosure according to claim 1, further comprising a blower for blowing a gas onto at least part of said vehicle.

11. The transportable vehicle enclosure according to claim 1, further comprising an integral dryer for drying said vehicle prior to inspection of said vehicle.

12. The transportable vehicle enclosure according to claim 11, wherein said vehicle comprises wheel rims and said integral dryer is configured to direct drying medium towards said wheel rims prior to entry into said mono-block housing.

13. The transportable vehicle enclosure according to claim 1, wherein said plurality of cameras are configured to pan and/or tilt to scan each panel of said vehicle when said vehicle is located within said mono-block housing.

14. The transportable vehicle enclosure according to claim 1, further comprising an entrance ramp with an integral blower.

15. The transportable vehicle enclosure according to claim 1, further comprising a nozzle directed towards said vehicle for cleaning said vehicle.

16. The transportable vehicle enclosure according to claim 1, further comprising a second light sensor disposed outside said mono-block housing, wherein said first driver is also configured to vary said first aperture by controlling said first shutter dependent upon a level of light sensed by said second light sensor disposed outside said mono-block housing.

17. The transportable vehicle enclosure according to claim 1, wherein said first driver is configured to vary said first aperture by controlling said first shutter dependent upon the level of light sensed within said mono-block housing by said first light sensor and dependent upon the level of light needed for imaging by the plurality of cameras.

18. A method of inspecting a vehicle comprising the steps of:
opening a transportable vehicle enclosure according to claim 1;
driving said vehicle into said enclosure;
closing said enclosure;
imaging a plurality of panels of said vehicle in all six of the orthogonal axes to assess individual panel damage;
opening said transportable vehicle enclosure; and
driving said vehicle out of said enclosure.

19. The method of claim 18, comprising the step of preparing a plurality of external parts of said vehicle.

20. The method of claim 19, comprising the step of treating the plurality of external parts of said vehicle.

21. The method according to claim 18, further comprising the step of blowing a medium onto said vehicle as said vehicle enters said enclosure.

22. The method according to claim 18, further comprising the step of imaging said vehicle from one or a combination of each one of the following: upper elevation, bottom elevation, right side elevation, left side elevation, front and rear elevation.

23. The method according to claim 18, further comprising the step of imaging a tire of said vehicle by providing a camera in a side elevation position of said tire, when said vehicle is provided in said enclosure.

24. The method according to claim 18, further comprising the step of providing a camera below said tire to image a tread of said tire when said vehicle is provided in said enclosure.

25. The method according to claim 18, further comprising the step of providing a window in said floor portion and a camera therein, and imaging at least part of an underside of said vehicle through said window.

* * * * *